United States Patent
Ge

(10) Patent No.: US 8,254,960 B1
(45) Date of Patent: Aug. 28, 2012

(54) MOBILE PHONE AND METHOD FOR SELECTIVELY SENDING LOCATION UPDATE REQUEST TO CELLULAR NETWORK

(75) Inventor: Chi-Sheng Ge, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/113,938

(22) Filed: May 23, 2011

(30) Foreign Application Priority Data

Mar. 21, 2011 (TW) .............................. 100109615 A

(51) Int. Cl.
*H04W 24/00* (2009.01)
(52) U.S. Cl. .................. 455/456.1; 455/456.2; 719/318; 701/208; 701/213
(58) Field of Classification Search ............... 455/456.1, 455/456.2; 709/318
See application file for complete search history.

(56) References Cited

U.S. PATENT DOCUMENTS

| | | | |
|---|---|---|---|
| 2011/0070896 A1* | 3/2011 | Persico ...................... 455/456.1 |
| 2011/0071759 A1* | 3/2011 | Pande et al. .................... 701/213 |
| 2011/0175773 A1* | 7/2011 | Syrjarinne et al. ....... 342/357.25 |
| 2011/0239229 A1* | 9/2011 | Meijer et al. .................. 719/318 |

* cited by examiner

*Primary Examiner* — Wayne Cai
*Assistant Examiner* — Michael Irace
(74) *Attorney, Agent, or Firm* — Altis Law Group, Inc.

(57) ABSTRACT

A method for selectively sending a location update request of a mobile phone is provided. The mobile phone determines whether it has entered a network coverage blind spot. Geographic information of the blind spot is obtained when the mobile phone is determined to have entered a network coverage blind spot, wherein the geographic information includes a length of the blind spot. The mobile phone senses a movement speed of the mobile phone if the network coverage blind spot is one of the predetermined blind spots. The mobile phone further calculates a time the mobile phone is in the blind spot according to the length of the blind spot and the movement speed of the mobile phone, and stop the periodical location update until the calculated time elapsed. The present disclosure further provides a related mobile phone.

5 Claims, 2 Drawing Sheets

MOBILE PHONE AND METHOD FOR SELECTIVELY SENDING LOCATION UPDATE REQUEST TO CELLULAR NETWORK

BACKGROUND

1. Technical Field

The present disclosure relates to wireless communication field and, particularly, to a mobile phone and a method for selectively sending a location update request to a cellular network to inform the cellular network which area the mobile phone is located.

2. Description of Related Art

In a cellular network, for example, a Universal Mobile Telecommunications System (UMTS) network or a Global System of Mobile communication (GSM) network, mobile phones are required to regularly inform the cellular network of its location at a set time interval using a periodic location update program, thus, ensuring that the mobile phones have reliable access to the cellular network and may be reached with a call while enjoying the freedom of mobility within the whole coverage area of the cellular network. With the periodic location update program, the mobile phones send location update requests regularly wherever the mobile phones are located. Sending a location update request consumes a lot of power. Therefore, sending the location update request when the mobile phone is in a network coverage blind spot is a waste of power.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
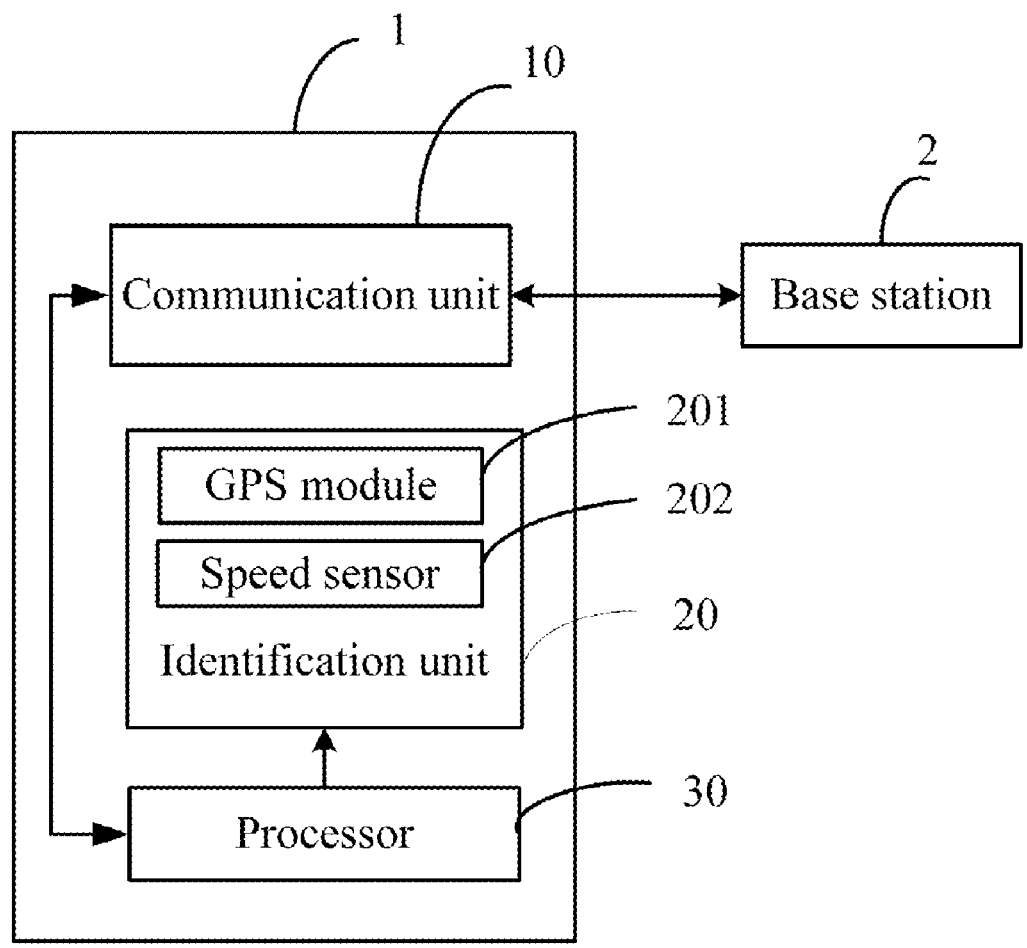
FIG. 1 is a block diagram of a mobile phone in accordance with an exemplary embodiment.

Referring to FIG. 1, an embodiment of a mobile phone 1 capable of communicating with other communication devices via a base station 2 is shown. The mobile phone 1 regularly sends a location update request to the base station 2 to report to the base station 2 its location at a set time interval using a periodic location update program.

The mobile phone 1 includes a communication unit 10, an identification unit 20, and a processor 30.

The communication unit 10 receives wireless signals from the base station 2 and transmits signals processed by the mobile phone 1 to the base station 2. In this embodiment, the wireless signals received from the base station 2 include a location update interval. The processor 30 stores the location update interval.

The identification unit 20 includes a GPS (Global Positioning System) module 201 and a speed sensor 202.

The processor 30 is configured to determine whether the mobile phone 1 enters a network coverage blind spot. In this embodiment, if the processor 30 determines that the mobile phone 1 cannot decode the received wireless signals correctly within a predetermined time interval, the processor 30 determines that the mobile phone 1 has entered a blind spot. If determining that the mobile phone 1 has entered the blind spot, the processor 30 directs the GPS module 201 to obtain geographic information of the blind spot. The geographic information includes a length L of the blind spot. The processor 30 further judges whether the blind spot is one of predetermined blind spots for example a tunnel according to the geographic information of the blind spot. The processor 30 still sends the location update request according to the location update interval when determining that the mobile phone 1 is not in one of the predetermined blind spots. The processor 30 further directs the speed sensor 202 to sense a movement speed V of the mobile phone 1 when determining that the mobile phone 1 is in one of the predetermined blind spots. In the embodiment, the speed of the mobile phone 1 is supposed to be constant to simplify explanation. The processor 30 is further configured to calculate a time T of the mobile phone 1 in the blind spot according to a formula $T=L/V$, and stop the periodical location update until the calculated time T elapsed. The processor 30 is further to send the location update request periodically according to the location update interval when the calculated time elapsed.

Figure 2:
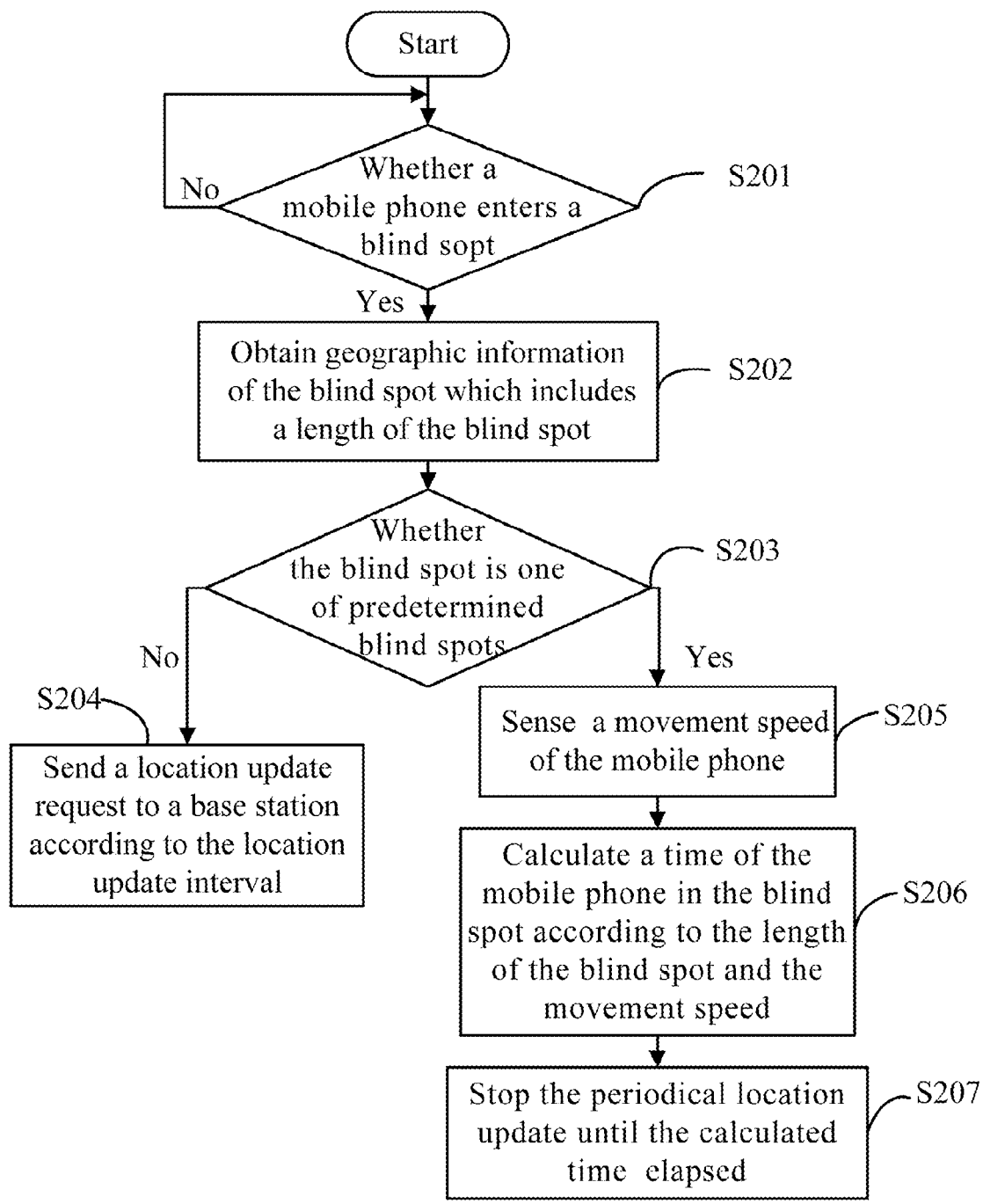
FIG. 2 is a flowchart of a method for selectively sending a location update request in accordance with an exemplary embodiment.

FIG. 2 is a flowchart of a method for selectively sending a location update request in accordance with an exemplary embodiment.

In step S201, the processor 30 determines whether the mobile phone 1 enters a network coverage blind spot. If yes, the procedure goes to step S202, otherwise, the processor 30 continues to determine whether the mobile phone 1 enters a network coverage blind spot.

In step S202, the processor 30 directs the GPS module 201 to obtain geographic information of the blind spot. The geographic information includes a length L of the blind spot.

In step S203, the processor 30 judges whether the blind spot is one of predetermined blind spots according to the geographic information of the blind spot. If not, the procedure goes up to step S204, otherwise the procedure goes up to step S205.

In step S204, the processor 30 sends the location update request according to the location update interval.

In step S205, the processor 30 directs the speed sensor 202 to sense a movement speed V of the mobile phone 1.

In step S206, the processor 30 calculates a time T of the mobile phone 1 in the entered blind spot according to the formula $T=L/V$.

In step S207, the processor 30 stop the periodical location update until the calculated time T elapsed.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mobile phone comprising:
   a GPS(Global Positioning System) module;
   a speed sensor; and
   a processor to determine whether the mobile phone enters a network coverage blind spot, direct the GPS module to obtain geographic information of the network coverage blind spot, determine whether the network coverage blind spot is one of predetermined blind spots according to the geographic information, direct the speed sensor to sense a movement speed of the mobile phone when the processor determines that the blind spot is one of the predetermined blind spots, calculate a time the mobile phone in the blind spot according to a length of the blind spot included in the geographic information and the movement speed of the mobile phone, and stop the periodical location update until the calculated time elapsed.

2. The mobile phone as described in claim 1, wherein the mobile phone stores a location update interval, the processor is further to send location update requests to the base station according to the location update interval when the processor determines that the network coverage blind spot is not one of the predetermined blind spots.

3. The mobile phone as described in claim 1, wherein the processor is to determine that the mobile phone enters the blind spot when the processor determines that the mobile phone cannot decode wireless signals received from the base station correctly within a predetermined time interval.

4. The mobile phone as described in claim 2, wherein the processor is further to send the location update request periodically according to the location update interval when the calculated time elapsed.

5. A method for selectively sending a location update request, the method comprising:

determining whether a mobile phone enters a network coverage blind spot;

obtaining geographic information of the network coverage blind spot, wherein the geographic information comprises a length of the blind spot;

determining whether the network coverage blind spot is one of the predetermined blind spots according to the geographic information;

sensing a movement speed of the mobile phone if the network coverage blind spot is one of the predetermined blind spots;

calculating the time the mobile phone in the network coverage blind spot according to the length of the blind spot and the movement speed of the mobile phone; and stopping the periodical location update until the calculated time elapsed.

\* \* \* \* \*